United States Patent
Sugimoto et al.

(10) Patent No.: US 12,533,736 B2
(45) Date of Patent: Jan. 27, 2026

(54) DIAMOND-COATED TOOL AND METHOD OF MANUFACTURING DIAMOND-COATED TOOL

(71) Applicant: SUMITOMO ELECTRIC HARDMETAL CORP., Hyogo (JP)

(72) Inventors: Rintaro Sugimoto, Hyogo (JP); Takashi Harada, Hyogo (JP); Minoru Yoshida, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 799 days.

(21) Appl. No.: 17/773,226

(22) PCT Filed: Oct. 9, 2020

(86) PCT No.: PCT/JP2020/038238
§ 371 (c)(1),
(2) Date: Apr. 29, 2022

(87) PCT Pub. No.: WO2021/090637
PCT Pub. Date: May 14, 2021

(65) Prior Publication Data
US 2022/0388078 A1    Dec. 8, 2022

(30) Foreign Application Priority Data
Nov. 8, 2019    (JP) ................... 2019-203330

(51) Int. Cl.
*B23C 5/16*    (2006.01)

(52) U.S. Cl.
CPC ............ *B23C 5/16* (2013.01); *B23C 2228/10* (2013.01)

(58) Field of Classification Search
None
See application file for complete search history.

(56) References Cited

U.S. PATENT DOCUMENTS
2006/0219158 A1    10/2006    Breidt et al.

FOREIGN PATENT DOCUMENTS
CN    108559970 A    9/2018
JP    H11-347805 A    12/1999
(Continued)

OTHER PUBLICATIONS
Translation—KR200188920-Y1; Bum-Young et al; Jul. 15, 2000 (Year: 2000).*
(Continued)

*Primary Examiner* — Humera N. Sheikh
(74) *Attorney, Agent, or Firm* — Renner, Otto, Boisselle & Sklar, LLP

(57) ABSTRACT

In a diamond-coated tool provided with a blade which includes a base material and a diamond layer formed on the base material, when a length of the blade along an extending direction thereof is denoted by L, and a thickness of the diamond layer of the blade is measured at a total number of 11 points which are arranged from one end of the blade along the extending direction thereof and separated from each other at an interval of L/10, the thickness is the same at all of the 11 points, or a ratio $d_{min}/d_{max}$ between a minimum value $d_{min}$ of the thickness and a maximum value $d_{max}$ of the thickness is 0.7 or more and less than 1.

7 Claims, 12 Drawing Sheets

(56) References Cited

FOREIGN PATENT DOCUMENTS

| | | | | |
|---|---|---|---|---|
| JP | 2000117523 A | * | 4/2000 | ............... B23C 5/10 |
| JP | 2006-521466 A | | 9/2006 | |
| JP | 2007-284773 A | | 11/2007 | |
| KR | 200188920 Y1 | * | 7/2000 | |

OTHER PUBLICATIONS

Translation—JP-2000117523-A; Kawanishi M; Apr. 25, 2000-0 (Year: 2000).*

* cited by examiner

DIAMOND-COATED TOOL AND METHOD OF MANUFACTURING DIAMOND-COATED TOOL

TECHNICAL FIELD

The present disclosure relates to a diamond-coated tool and a method of manufacturing the diamond-coated tool. The present application claims the benefit of priority to Japanese Patent Application No. 2019-203330 filed on Nov. 8, 2019, the entire contents of which are incorporated herein by reference.

BACKGROUND ART

Diamond has a very high hardness, and the smooth surface of diamond has a very low coefficient of friction. Therefore, natural single-crystal diamond and artificial diamond powder have been used in tool applications. Further, after a technique for forming a diamond thin film by a chemical vapor deposition (CVD) process has been established in the 1980s, there has been developed a cutting tool or a wear-resistant tool in which a diamond thin film is formed on a three-dimensional base material.

Japanese Patent Laying-Open No. 11-347805 (PTL 1) discloses a diamond-coated tool member in which a hard film of diamond is coated on a surface of a base material made of cemented carbide.

CITATION LIST

Patent Literature

PTL 1: Japanese Patent Laying-Open No. 11-347805

SUMMARY OF INVENTION

A diamond-coated tool of the present disclosure is a diamond-coated tool provided with a blade which includes a base material and a diamond layer formed on the base material. When a length of the blade along an extending direction thereof is denoted by L, and a thickness of the diamond layer of the blade is measured at a total number of 11 points which are arranged from one end of the blade along the extending direction thereof and separated from each other at an interval of L/10, the thickness is the same at all of the 11 points, or a ratio $d_{min}/d_{max}$ between a minimum value $d_{min}$ of the thickness and a maximum value $d_{max}$ of the thickness is 0.7 or more and less than 1.

A method of manufacturing a diamond-coated tool according to the present disclosure is a method of manufacturing the diamond-coated tool as described above, the method includes: preparing a base material; and forming a diamond layer on the base material by a hot filament CVD process to obtain the diamond-coated tool. The hot filament CVD process is performed in such a manner that the temperature distribution in a blade of the base material where a cutting edge is formed is controlled within 5%.

DETAILED DESCRIPTION

Figure 1:
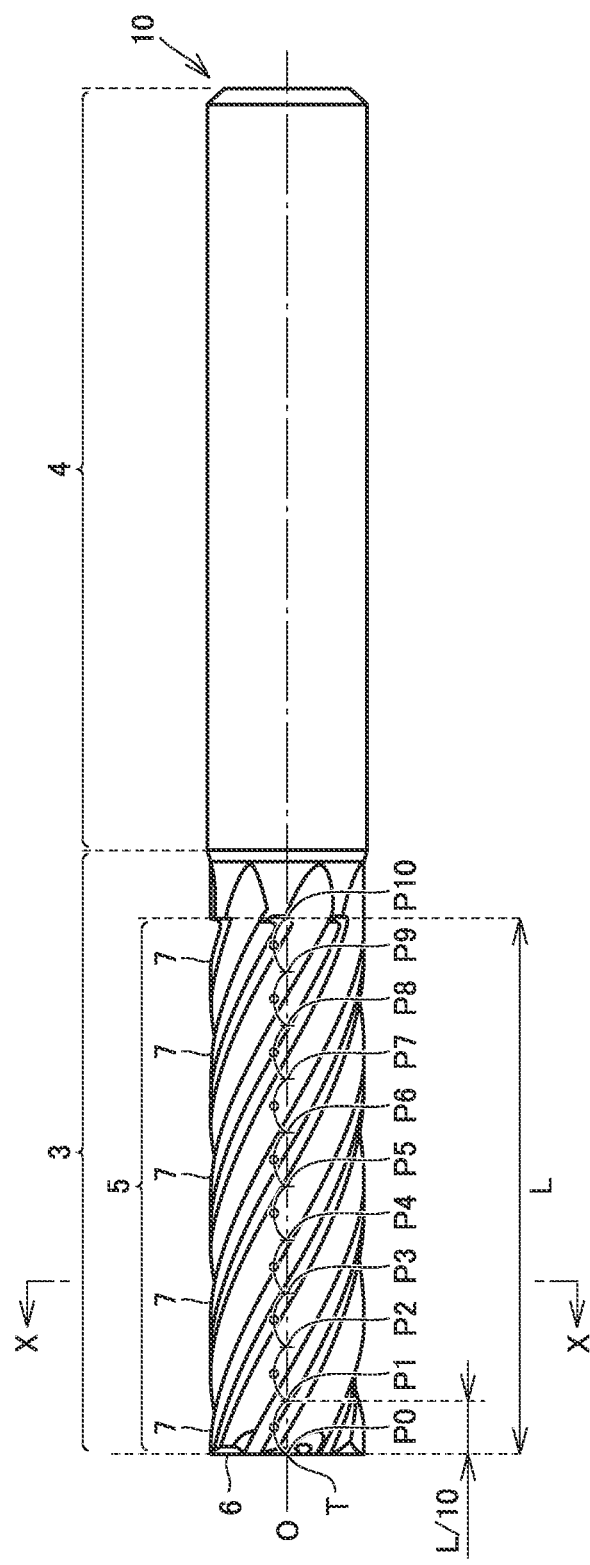
FIG. 1 is a view illustrating an example configuration of a diamond-coated tool according to Embodiment 1-1.

Problem to be Solved by the Present Disclosure

In a diamond-coated tool, if the thickness and crystallinity of a diamond layer on a base material are uneven, the occurrence frequency of the wear or peeling of the diamond layer in the diamond-coated tool may become uneven, which may reduce the tool life. Therefore, it is required that a diamond-coated tool includes a diamond layer with uniform thickness and uniform crystallinity, and thereby has a longer tool life.

An object of the present disclosure is to provide a diamond-coated tool having a longer tool life.

Advantageous Effect of the Present Disclosure

According to the present disclosure, the diamond-coated tool can have a longer tool life.

DESCRIPTION OF EMBODIMENTS OF THE PRESENT DISCLOSURE

First, embodiments of the present disclosure will be summarized.

(1) A diamond-coated tool of the present disclosure is a diamond-coated tool provided with a blade which includes a base material and a diamond layer formed on the base material. When a length of the blade along an extending direction thereof is denoted by L, and a thickness of the diamond layer of the blade is measured at a total number of 11 points which are arranged from one end of the blade along the extending direction thereof and separated from each other at an interval of L/10, the thickness is the same at all of the 11 points, or a ratio $d_{min}/d_{max}$ between a minimum value $d_{min}$ of the thickness and a maximum value $d_{max}$ of the thickness is 0.7 or more and less than 1.

According to the present disclosure, the diamond-coated tool can have a longer tool life.

(2) It is preferable that the ratio $d_{min}/d_{max}$ is 0.85 or more and less than 1. Thereby, the tool life of the diamond-coated tool is further improved.

(3) When a Raman spectrum of the diamond layer in the range of Raman shift 900 cm$^{-1}$ to 2000 cm$^{-1}$ is measured at a first point where the thickness has a minimum value $d_{min}$ and a second point where the thickness has a maximum value $d_{max}$, it is preferable that a ratio $I_{min}/I_{max}$ between $I_{min}$, which is a ratio $Id_{min}/Is_{min}$ at the first point between a peak area intensity $Id_{min}$ of diamond and an area intensity $Is_{min}$ of the entire spectrum, and $I_{max}$, which is a ratio $Id_{max}/Is_{max}$ at the second point between a peak area intensity $Id_{max}$ of diamond and an area intensity $Is_{max}$ of the entire spectrum, is 0.7 or more and 1 or less.

Thereby, the tool life of the diamond-coated tool is further improved.

(4) When the C1s spectrum of the diamond layer is measured by X-ray photoelectron spectroscopy at a first point where the thickness has a minimum value $d_{min}$ and a second point where the thickness has a maximum value $d_{max}$, it is preferable that a ratio $Ix_{min}/Ix_{max}$ between $Ix_{min}$, which is a ratio $I3_{min}/I2_{min}$ at the first point between a peak area intensity $I3_{min}$ of sp3 carbon and a peak area intensity $I2_{min}$ of sp2 carbon, and $Ix_{max}$, which is a ratio $I3_{max}/I2_{max}$ at the second point between a peak area intensity $I3_{max}$ of sp3 carbon and a peak area intensity $I2_{max}$ of sp2 carbon, is 0.7 or more and 1 or less.

Thereby, the tool life of the diamond-coated tool is further improved.

(5) When the average particle diameter of the diamond layer is measured by electron backscatter diffraction at a first point where the thickness has a minimum value $d_{min}$ and a second point where the thickness has a maximum value $d_{max}$, it is preferable that a ratio $D_{min}/D_{max}$ between an average particle diameter $D_{min}$ at the first point and an average particle diameter $D_{max}$ at the second point is 0.7 or more and 1 or less.

Thereby, the tool life of the diamond-coated tool is further improved.

(6) When a surface roughness Ra of the diamond layer is measured with a laser microscope at a first point where the thickness has a minimum value $d_{min}$ and a second point where the thickness has a maximum value $d_{max}$, it is preferable that a ratio $R_{min}/R_{max}$ between a surface roughness $R_{min}$ at the first point and a surface roughness $R_{max}$ at the second point is 0.7 or more and 1 or less.

Thereby, the tool life of the diamond-coated tool is further improved.

(7) A method of manufacturing a diamond-coated tool according to the present disclosure is a method of manufacturing the diamond-coated tool as described above, the method includes: preparing a base material; and forming a diamond layer on the base material by a hot filament CVD process to obtain the diamond-coated tool. The hot filament CVD process is performed in such a manner that the temperature distribution in a blade of the base material where a cutting edge is formed is controlled within 5%.

According to the present disclosure, it is possible to manufacture a diamond-coated tool that includes a diamond layer with uniform thickness, and thereby has a longer tool life.

Details of Embodiments of the Present Disclosure

Hereinafter, specific examples of a diamond-coated cutting tool of the present disclosure will be described with reference to the drawings. In the drawings of the present disclosure, the same or equivalent portions will be denoted by the same reference numerals. Further, the dimensions such as the length, the width, the thickness, and the depth in the drawings may be modified appropriately for the purpose of clarity and simplification, and may not necessarily represent the actual dimensions.

In the present specification, the expression in the form of "A to B" refers to an upper limit and a lower limit of a range (in other words, A or more and B or less), and if A is described with no unit but B is described with a unit, it means that A and B have the same unit.

Embodiment 1: Diamond-Coated Tool

Figure 2:
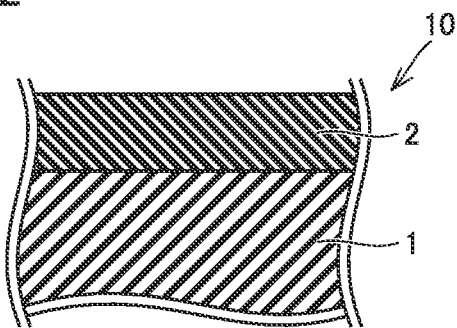
FIG. 2 is a cross-sectional view taken along line X-X of a diamond-coated tool illustrated in FIGS. 1, 3 and 4.

FIG. 1 is a view illustrating an example configuration in which the diamond-coated tool is an end mill. FIG. 2 is a cross-sectional view taken along line X-X of the diamond-coated tool illustrated in FIG. 1.

As illustrated in FIGS. 1 and 2, the diamond-coated tool is a diamond-coated tool 10 provided with a blade 5 which includes a base material 1 and a diamond layer 2 formed on the base material 1, when the length of the blade 5 along an extending direction thereof is denoted by L, and the thickness of the diamond layer of the blade 5 is measured at a total number of 11 points which are arranged from one end of the blade along the extending direction thereof and separated from each other at an interval of L/10, the thickness is the same at all of the 11 points, or a ratio $d_{min}/d_{max}$ between a minimum value $d_{min}$ of the thickness and a maximum value $d_{max}$ of the thickness is 0.7 or more and less than 1.

Since the thickness of the diamond layer in the diamond-coated tool of the present disclosure is uniform, the occurrence frequency of the wear or peeling of the diamond layer is uniform, and thereby, the diamond-coated tool can have a longer tool life.

Figure 3:
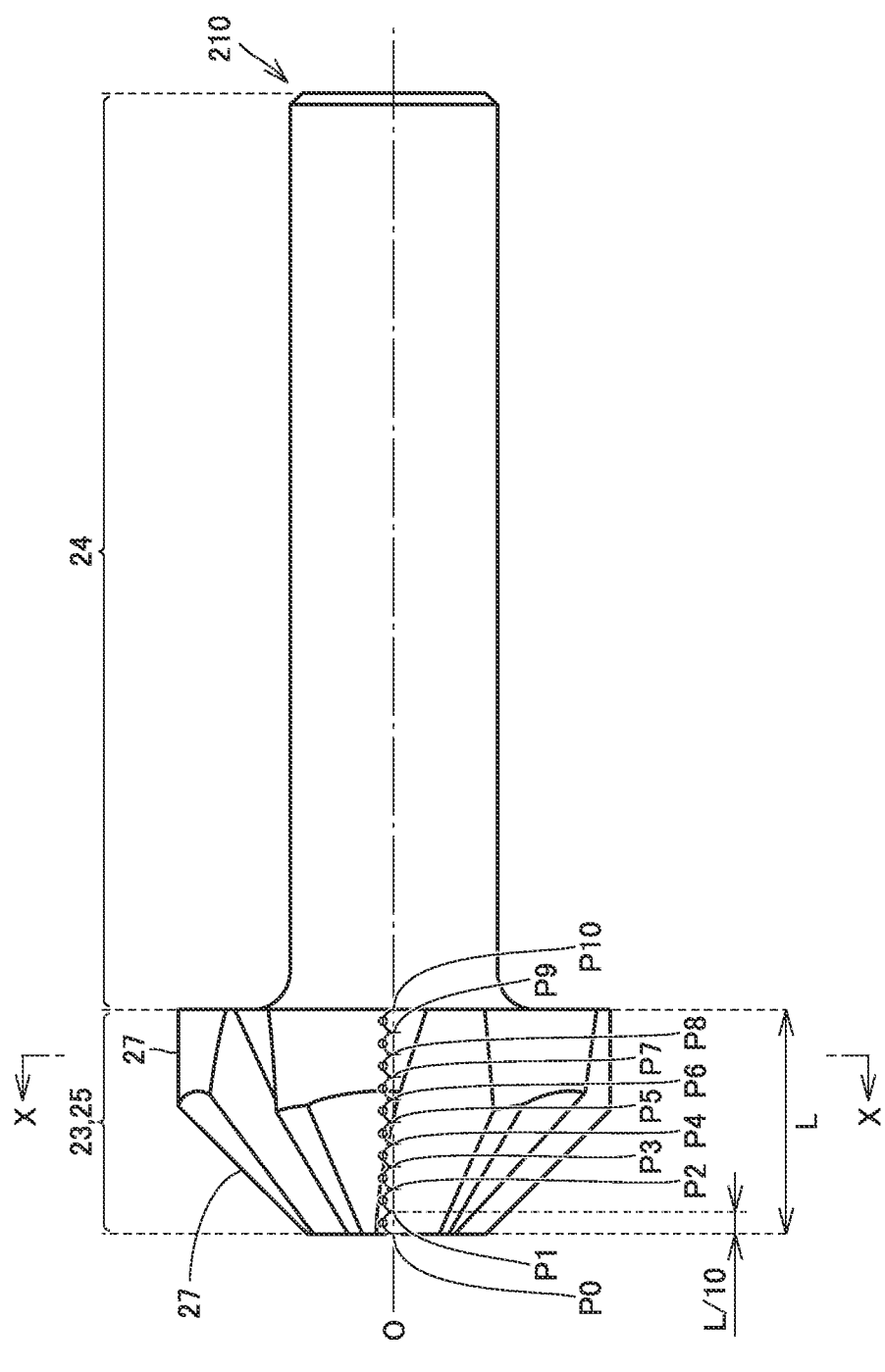
FIG. 3 is a view illustrating an example configuration of a diamond-coated tool (a tapered cutter) according to Embodiment 1-2.
Figure 4:
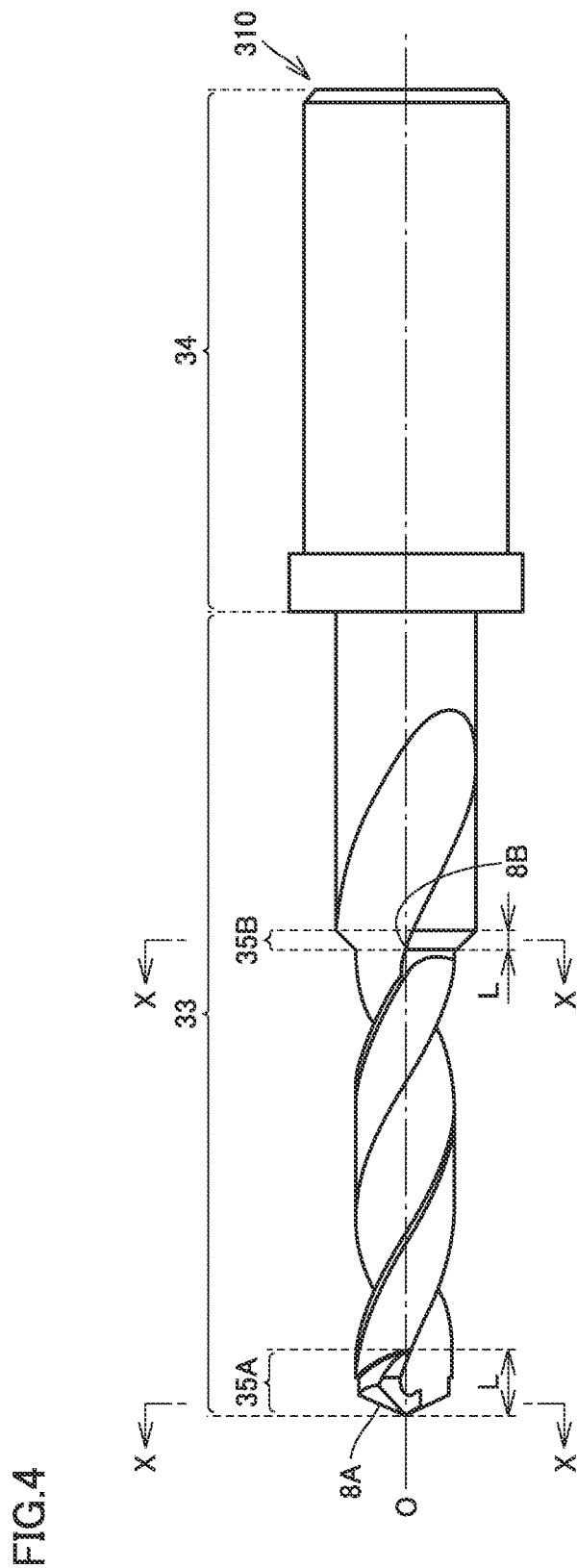
FIG. 4 is a view illustrating an example configuration of a diamond-coated tool (a drill) according to Embodiment 1-3.
Figure 5:
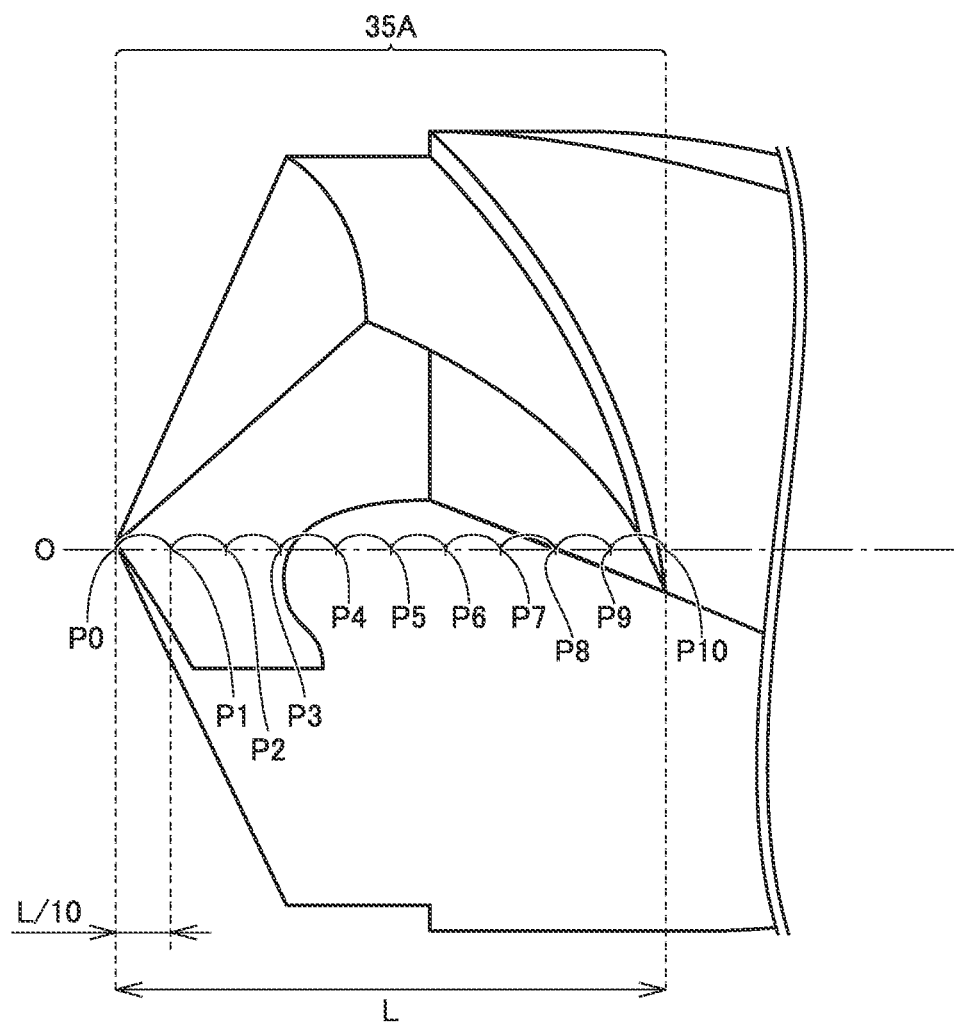
FIG. 5 is an enlarged view illustrating a first blade 35A of FIG. 4.
Figure 6:
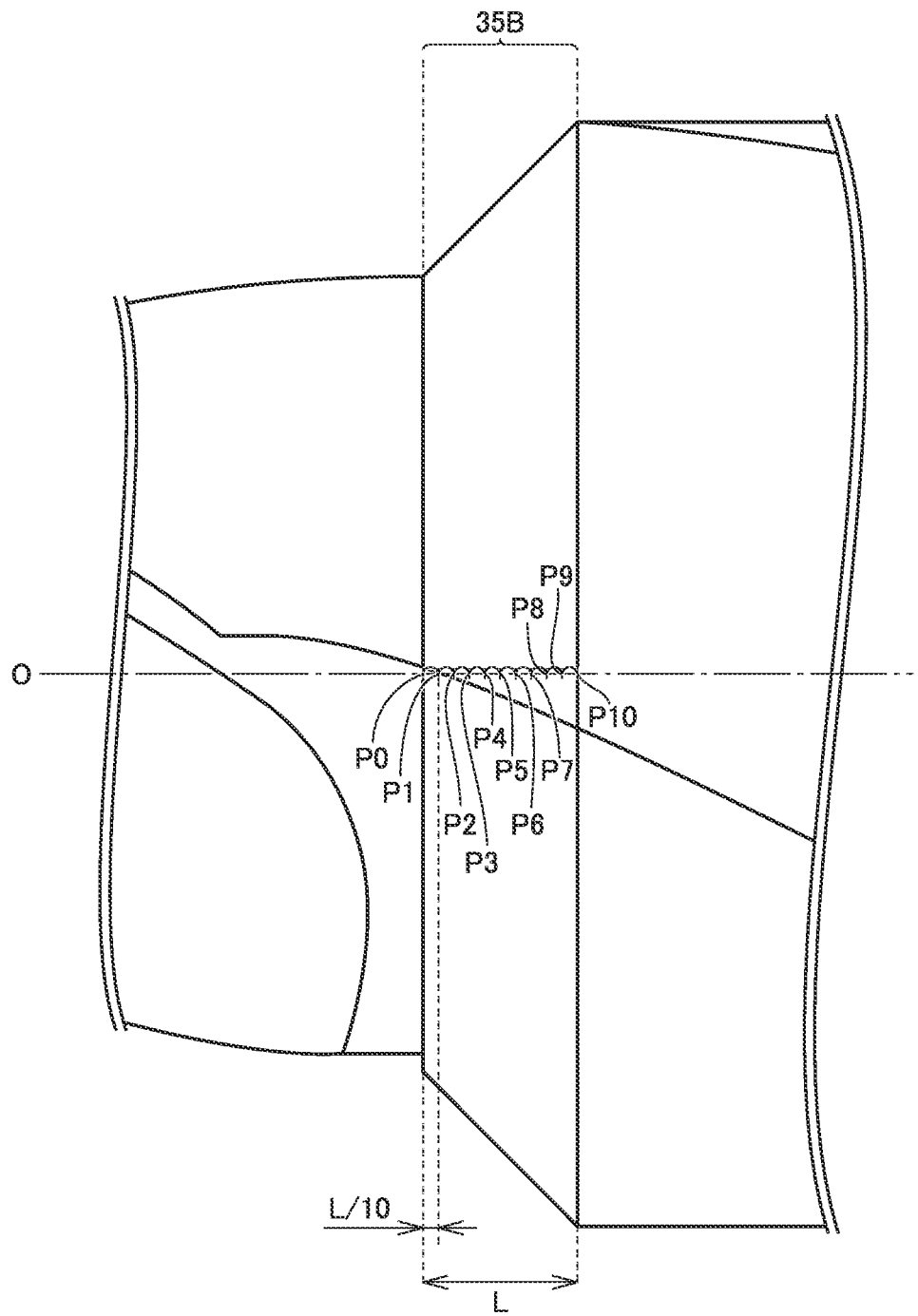
FIG. 6 is an enlarged view illustrating a second blade 35B of FIG. 4.

Hereinafter, specific examples of the diamond-coated tool of the present disclosure will be described with reference to FIGS. 1 to 6. Although FIG. 1 illustrates that the diamond-coated tool is an end mill, FIG. 3 illustrates that the diamond-coated tool is a tapered cutter, and FIGS. 4 to 6 illustrate that the diamond-coated tool is a drill, the type of the diamond-coated tool is not limited thereto. The diamond-coated tool of the present disclosure may be a cutting tool such as a turning tool, a cutter, a drill or an end mill, or a wear-resistant tool such as a die, a bending die, a drawing die, or a bonding tool.

Embodiment 1-1: End Mill

In Embodiment 1-1, the diamond-coated tool is an end mill. As illustrated in FIG. 1, the end mill, i.e., a diamond-coated tool 10 includes a body 3 and a shank 4 connected to the body 3. The body 3 includes a blade 5 which is formed with a cutting edge, and the cutting edge is constituted by a bottom cutting edge 6 and a peripheral cutting edge 7. As illustrated in FIG. 2, in the cross section taken along line X-X, the blade 5 includes a base material 1 and a diamond layer 2 formed on the base material 1.

As illustrated in FIG. 1, the blade 5 extends along a rotation axis O of the tool. Therefore, in Embodiment 1-1, the length L of the blade 5 along an extending direction thereof refers to the length of the blade 5 along the rotation axis O of the tool.

<Base Material>

The base material may be any conventionally known material without particular limitation. For example, examples of the base material may include cemented carbide (for example, WC-based cemented carbide which includes WC, Co and/or other additives such as carbonitrides of Ti, Ta or Nb), a cermet (which contains TiC, TiN, TiCN, or the like as the main component), a high-speed steel, a tool steel, a ceramic (examples thereof include titanium carbide, silicon carbide, silicon nitride, aluminum nitride, aluminum oxide, and mixtures thereof), a cubic boron nitride sintered body, or the like.

Among the base materials mentioned above, WC-based cemented carbide and cermet (especially TiCN-based cermet) are preferable. This is because WC-based cemented carbide and cermet are particularly well balanced between hardness and strength at high temperatures, and have excellent properties as a base material for diamond-coated cutting tools.

<Diamond Layer>

The diamond layer may be formed by any conventionally known chemical vapor deposition (CVD) process. It is preferable that the diamond layer is formed by a hot filament CVD process.

(Thickness)

In the blade 5, when the thickness of the diamond layer is measured at a total number of 11 points (indicated by P0 to P10 in FIG. 1) arranged from one end (a distal end T in FIG. 1) along the extending direction (axis O) and separated from each other at an interval of L/10, the thickness is the same at all of the 11 points, or a ratio $d_{min}/d_{max}$ between a minimum value $d_{min}$ of the thickness and a maximum value $d_{max}$ of the thickness is 0.7 or more and less than 1. Thus, the diamond-coated tool includes a diamond layer with uniform thickness, and thereby can have a longer tool life.

The ratio $d_{min}/d_{max}$ is preferably 0.85 or more and less than 1, and more preferably 0.95 or more and less than 1.

In the present specification, the thickness of the diamond layer is measured by the following procedures (1-1) and (1-2).

(1-1) Measure the length L of the blade 5 along the rotation axis O. Next, at one end of the blade (i.e., the distal end T of the tool in FIG. 1) and at each of the points (a total number of 11 points including both end points indicated by P0 to P10 in FIG. 1) provided within a length of (L/10)×n (n is an integer of 0 or more and 10 or less) from the one end of the blade, the diamond-coated tool is cut out in a direction perpendicular to the rotation axis O by using a wire electric discharge machine so as to expose the cross section at each point.

(1-2) Measure the thickness of the diamond layer by observing the cross section at each point by using a scanning electron microscope (SEM, such as "JEM-2100F/Cs" (trademark) manufactured by JEOL, Ltd). Specifically, under conditions that an observation field is set to an area of 100 μm² and the magnification for observing the cross-section of each sample is set to 5000 times, the thickness is measured at three points in the observation field, and the average value of the thicknesses at the three points is defined as the thickness in the observation field. The measurement is performed in five observation fields, and the average value of the thicknesses in the five observation fields is defined as the thickness of the diamond layer.

The minimum value $d_{min}$ of the thickness of the diamond layer, for example, may have a lower limit of 3 μm, 4 μm or 5 μm, and an upper limit of 28 μm, 29 μm or 30 μm.

The maximum value $d_{max}$ of the thickness of the diamond layer, for example, may have a lower limit of 3 μm, 4 μm or 5 μm, and an upper limit of 28 μm, 29 μm or 30 μm.

(Raman Spectrum)

When a Raman spectrum of the diamond layer in the range of Raman shift 900 cm$^{-1}$ to 2000 cm$^{-1}$ is measured at the first point where the thickness of the diamond layer has a minimum value $d_{min}$ and the second point where the thickness of the diamond layer has a maximum value $d_{max}$, a ratio $I_{min}/I_{max}$ between $I_{min}$, which is a ratio $Id_{min}/Is_{min}$ at the first point between a peak area intensity $Id_{min}$ of diamond and an area intensity $Is_{min}$ of the entire spectrum, and $I_{max}$, which is a ratio $Id_{max}/Is_{max}$ at the second point between a peak area intensity $Id_{max}$ of diamond and an area intensity $Is_{max}$ of the entire spectrum, is 0.7 or more and 1 or less.

Thereby, the tool life of the diamond-coated tool is further improved. Although the reason therefor is not clear, it is considered that when the ratio $I_{min}/I_{max}$ is 0.7 or more, the crystallinity of the diamond becomes uniform over the entire area of the diamond layer, which thereby makes the wear resistance and the peeling resistance of the diamond layer in the blade uniform.

The ratio $I_{min}/I_{max}$ is more preferably 0.85 or more and 1 or less, and still more preferably 0.9 or more and 1 or less.

In the present specification, the ratio $I_{min}/I_{max}$ is calculated by the following procedures (2-1) to (2-6).

(2-1) Based on the measurement result of the thickness of the diamond layer, determine a first point at which the thickness of the diamond layer has a minimum value $d_{min}$ and a second point at which the thickness of the diamond layer has a maximum value $d_{max}$. At the first point and the second point, the diamond-coated tool is cut out in a direction perpendicular to the rotation axis O by using a wire electric discharge machine so as to expose the cross section at each point. Each cross section is mirror-polished by using a diamond slurry having an average particle diameter of 3 μm.

(2-2) Set a rectangular measurement field (hereinafter also referred to as a "Raman spectroscopic measurement field") of 50 μm×50 μm in the cross section of each point in the diamond layer.

Figure 7:
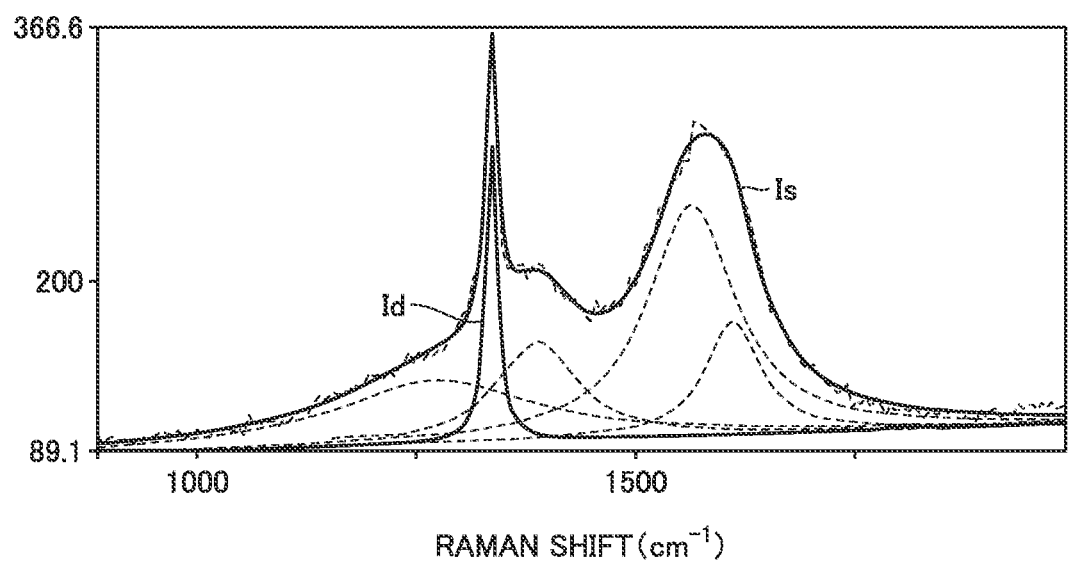
FIG. 7 is a diagram illustrating a Raman spectrum measured at a first point as an example.
Figure 8:
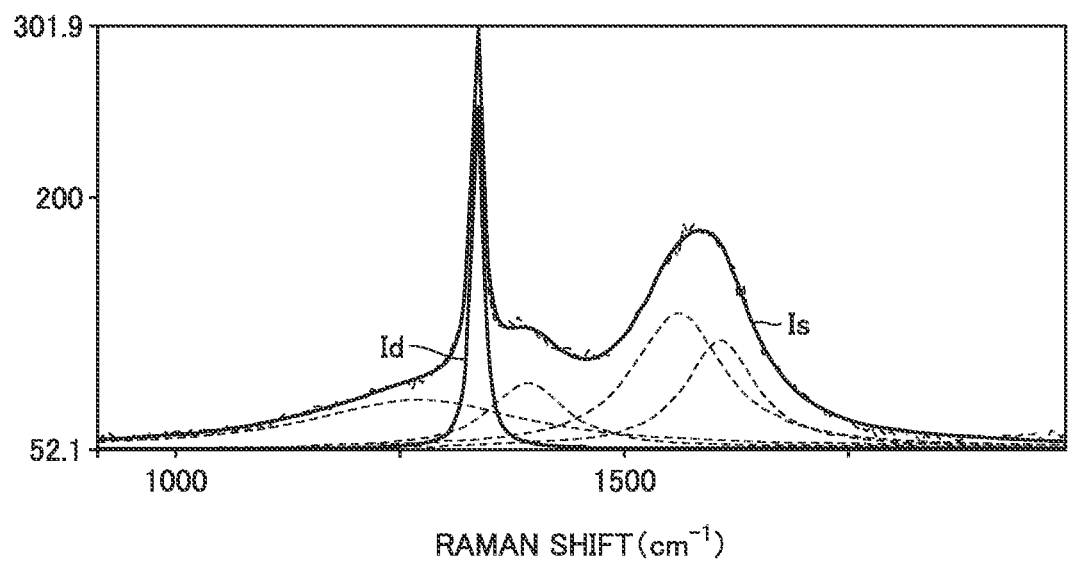
FIG. 8 is a diagram illustrating a Raman spectrum measured at a second point as an example.

(2-3) Measure a Raman spectrum in the range of Raman shift 900 cm$^{-1}$ to 2000 cm$^{-1}$ for each Raman spectroscopic measurement field by using a laser Raman measurement method in accordance with JIS-K0137 (2010). As the Raman spectrometer, "Ramantouch" (trademark) manufactured by NanoPhoton Corporation is used. Examples of Raman spectra at the first point and the second point are illustrated in FIGS. 7 and 8, respectively. In FIGS. 7 and 8, the spectrum indicated by Id indicates the spectrum derived from diamond, and the spectrum indicated by Is indicates the sum of all the spectra illustrated in FIGS. 7 and 8, respectively.

(2-4) For the Raman spectrum at the first point, calculate $I_{min}$, which is a ratio $Id_{min}/Is_{min}$ between a peak area intensity $Id_{min}$ of diamond and an area intensity $Is_{min}$ of the entire spectrum, by using an image processing software ("Ramanimager" (trademark) manufactured by NanoPhoton Corporation). The measurement is performed in three measurement fields at the first point, and the average value of the three measurement fields is defined as "$I_{min}$ at the first point".

(2-5) For the Raman spectrum at the second point, calculate $I_{max}$, which is a ratio $Id_{max}/Is_{max}$ between a peak area intensity $Id_{max}$ of diamond and an area intensity $Is_{max}$ of the entire spectrum, by using an image processing software ("Ramanimager" (trademark) manufactured by NanoPhoton Corporation). The measurement is performed in three measurement fields at the second point, and the average value of the three measurement fields is defined as "$I_{max}$ at the second point".

(2-6) Calculate the ratio $I_{min}/I_{max}$ based on the "$I_{min}$ at the first point" and the "max at the second point".

For example, the $I_{min}$ at the first point may have a lower limit of 0.25, 0.35 or 0.40, and an upper limit of 0.70, 0.80 or 0.90.

For example, the $I_{max}$ at the second point may have a lower limit of 0.25, 0.35 or 0.40, and an upper limit of 0.70, 0.80 or 0.90.

(C1s Spectrum)

When the C1s spectrum of the diamond layer is measured by X-ray photoelectron spectroscopy (XPS) at the first point where the thickness has a minimum value $d_{min}$ and the second point where the thickness has a maximum value $d_{max}$, the ratio $Ix_{min}/Ix_{max}$ between $Ix_{min}$, which is a ratio $I3_{min}/I2_{min}$ at the first point between a peak area intensity $I3_{min}$ of sp3 carbon and a peak area intensity $I2_{min}$ of sp2 carbon, and $Ix_{max}$, which is a ratio $I3_{max}/I2_{max}$ at the second point between a peak area intensity $I3_{max}$ of sp3 carbon and a peak area intensity $I2_{max}$ of sp2 carbon, is preferably 0.7 or more and 1 or less.

Thereby, the tool life of the diamond-coated tool is further improved. Although the reason therefor is not clear, it is considered that when the ratio $Ix_{min}/Ix_{max}$ is 0.7 or more, the crystallinity of the diamond becomes uniform over the entire area of the diamond layer, which thereby makes the wear resistance and the peeling resistance of the diamond layer in the blade uniform.

The ratio $Ix_{min}/Ix_{max}$ is more preferably 0.7 or more and 1 or less, and further preferably 0.85 or more and 1 or less.

In the present specification, the ratio $Ix_{min}/Ix_{max}$ is calculated by the following procedures (3-1) to (3-6).

(3-1) Based on the measurement result of the thickness of the diamond layer, determine a first point at which the thickness of the diamond layer has a minimum value $d_{min}$ and a second point at which the thickness of the diamond layer has a maximum value $d_{max}$. At the first point and the second point, the diamond-coated tool is cut out in a direction perpendicular to the rotation axis O by using a wire electric discharge machine so as to expose the cross section at each point. Each cross section is mirror-polished by using a diamond slurry having an average particle diameter of 3 μm.

(3-2) Set a rectangular measurement field (hereinafter also referred to as "XPS measurement field") of 50 μm×50 μm in the cross section of each point in the diamond layer.

Figure 9:
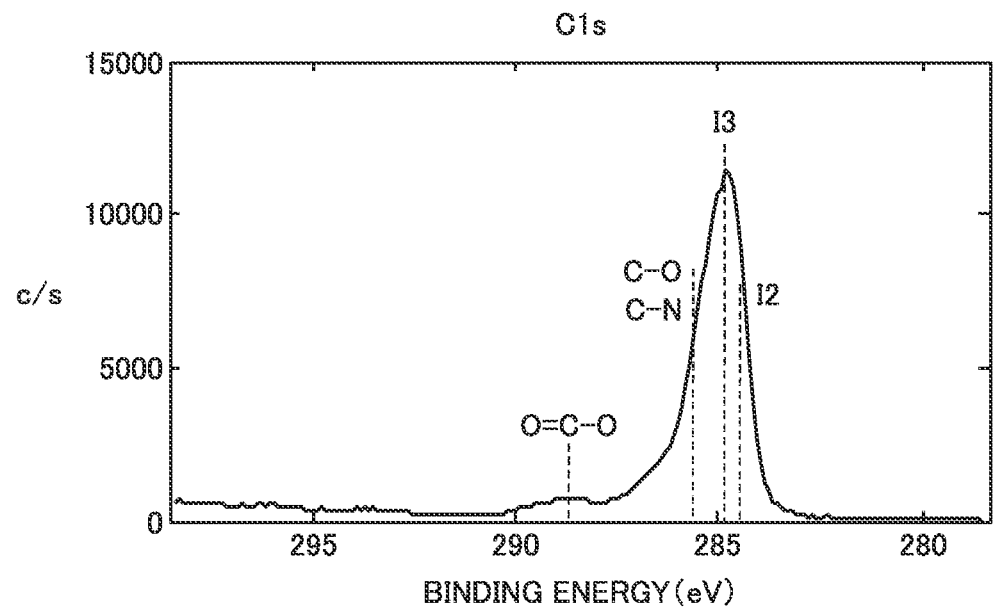
FIG. 9 is a diagram illustrating a C1s spectrum measured at a first point as an example.
Figure 10:
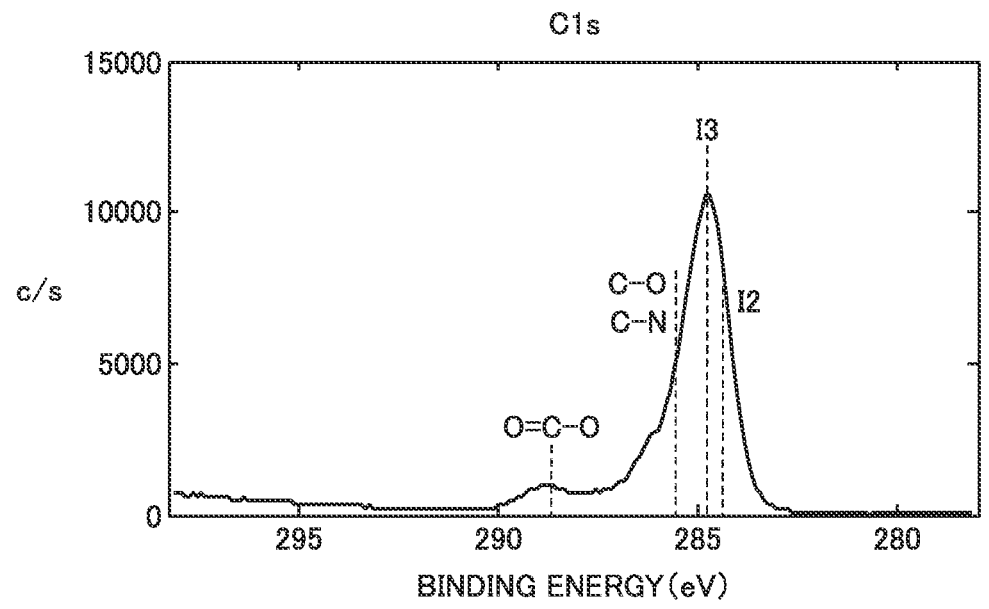
FIG. 10 is a diagram illustrating a C1s spectrum measured at a second point as an example.

(3-3) Measure a C1s spectrum for each XPS measurement field by using X-ray photoelectron spectroscopy. As the X-ray photoelectron spectrometer, "QuanteraSXM" (trademark) manufactured by ULVAC-PHI, Incorporated is used. Examples of C1s spectra at the first point and the second point are illustrated in FIGS. 9 and 10, respectively.

(3-4) For the C1s spectrum at the first point, calculate $Ix_{min}$, which is a ratio $I3_{min}/I2_{min}$ between a peak area intensity $I3_{min}$ of sp3 carbon and a peak area intensity $I2_{min}$ of sp2 carbon, by using an image processing software ("PHI MultiPak" (trademark) manufactured by ULVAC-PHI, Incorporated). The measurement is performed in three measurement fields at the first point, and the average value of the three measurement fields is defined as "$Ix_{min}$ at the first point".

(3-5) For the C1s spectrum at the second point, calculate $Ix_{max}$, which is a ratio $I3_{max}/I2_{max}$ between a peak area intensity $I3_{max}$ of sp3 carbon and a peak area intensity $I2_{max}$ of sp2 carbon, by using an image processing software ("PHI MultiPak" (trademark) manufactured by ULVAC-PHI, Incorporated). The measurement is performed in three measurement fields at the second point, and the average value of the three measurement fields is defined as "$Ix_{max}$ at the second point".

(3-6) Calculate the ratio $Ix_{min}/Ix_{max}$ based on the "$Ix_{min}$ at the first point" and the "$Ix_{max}$ at the second point".

For example, the $Ix_{min}$ at the first point may have a lower limit of 0.40, 0.45 or 0.50, and an upper limit of 0.70, 0.80 or 0.90.

For example, the $Ix_{max}$ at the second point may have a lower limit of 0.40, 0.45 or 0.50, and an upper limit of 0.70, 0.80 or 0.90.

(Average Particle Diameter)

When the average particle diameter is measured by electron backscatter diffraction (EBSD) at the first point where the thickness has a minimum value $d_{min}$ and the second point where the thickness has a maximum value $d_{max}$, the ratio $D_{min}/D_{max}$ between the average particle diameter $D_{min}$ at the first point and the average particle diameter $D_{max}$ at the second point is preferably 0.7 or more and not more than 1.

Thereby, the tool life of the diamond-coated tool is further improved. Although the reason therefor is not clear, it is considered that when the ratio $D_{min}/D_{max}$ is 0.7 or more, the average particle diameter of diamond over the entire area of the diamond layer becomes uniform, which thereby makes the wear resistance and the chipping resistance of the diamond layer in the blade uniform.

The ratio $D_{min}/D_{max}$ is more preferably 0.7 or more and 1 or less, and further preferably 0.85 or more and 1 or less.

In the present specification, the "average particle diameter" refers to the median diameter (d50) in volume-based particle size distribution (volume distribution).

The ratio $D_{min}/D_{max}$ is calculated by the following procedures (4-1) to (4-5).

(4-1) Based on the measurement result of the thickness of the diamond layer, determine a first point where the thickness of the diamond layer has a minimum value $d_{min}$ and a second point where the thickness of the diamond layer has a maximum value $d_{max}$. At the first point and the second point, the diamond-coated tool is cut out in a direction perpendicular to the rotation axis O by using a wire electric discharge machine so as to expose the cross section at each point. Each cross section is mirror-polished by using a diamond slurry having an average particle diameter of 3 μm.

(4-2) Set a rectangular measurement field (hereinafter also referred to as "EBSD measurement field") of 2 μm×2 μm in the cross section of each point in the diamond layer. The measurement field is set in such a manner that the distance from one side of the measurement field to the surface of the diamond layer is 2 μm, and the distance from the entire measurement field to the surface of the diamond layer is 2 μm or more.

(4-3) Measure the particle diameters of all diamonds in the EBSD measurement field at the first point by electron backscatter diffraction, and calculate the median diameter (d50). As the electron backscatter diffraction apparatus, "SUPRA35VP" (trademark) manufactured by ZEISS is used. The measurement is performed in three measurement fields at the first point, and the average value of the three measurement fields is defined as "$D_{min}$ at the first point".

(4-4) Measure the particle diameters of all diamonds in the EBSD measurement field at the second point by electron backscatter diffraction, and calculate the median diameter (d50). The measurement is performed in three measurement fields at the second point, and the average value of the three measurement fields is defined as "$D_{max}$ at the second point".

(4-5) Calculate the ratio $D_{min}/D_{max}$ based on the "$D_{min}$ at the first point" and the "$D_{max}$ at the second point".

For example, the $D_{min}$ at the first point may have a lower limit of 50 nm, 75 nm or 100 nm, and an upper limit of 800 nm, 900 nm or 1000 nm.

For example, the $D_{max}$ at the second point may have a lower limit of 50 nm, 75 nm or 100 nm, and an upper limit of 800 nm, 900 nm or 1000 nm.

(Surface Roughness Ra)

When the surface roughness Ra of the diamond layer is measured with a laser microscope at a first point where the thickness has a minimum value $d_{min}$ and a second point where the thickness has a maximum value $d_{max}$, the ratio $R_{min}/R_{max}$ between a surface roughness $R_{min}$ at the first point and a surface roughness $R_{max}$ at the second point is preferably 0.7 or more and not more than 1.

Thereby, the tool life of the diamond-coated tool is further improved. Although the reason therefor is not clear, it is considered that when the ratio $R_{min}/R_{max}$ is 0.7 or more, the surface roughness of the diamond layer over the entire area of the diamond layer becomes uniform, which thereby makes the wear resistance of the diamond layer in the blade uniform.

The ratio $R_{min}/R_{max}$ is more preferably 0.7 or more and 1 or less, and further preferably 0.85 or more and 1 or less.

In the present specification, the "surface roughness Ra" refers to an arithmetic average roughness Ra defined in JIS B 0601, and it is defined as a value obtained by extracting a reference segment from a roughness curve in the direction of an average line thereof and averaging the sum of distances (the absolute deviation values) from the average line of the reference segment to the measurement curve.

The ratio $R_{min}/R_{max}$ is calculated by the following procedures (5-1) to (5-4).

(5-1) Based on the measurement result of the thickness of the diamond layer, determine a first point where the thickness of the diamond layer has a minimum value $d_{min}$ and a second point where the thickness of the diamond layer has a maximum value $d_{max}$.

(5-2) Set a rectangular measurement field of 50 μm×50 μm on the surface of the diamond layer so as to include the first point. The surface roughness in the measurement field is measured with a laser microscope ("OPTELICS HYBRID" (trademark) manufactured by Lasertec Corporation). The surface roughness is defined as the "surface roughness $R_{min}$ at the first point".

(5-3) Set a rectangular measurement field of 50 μm×50 μm on the surface of the diamond layer so as to include the second point. The surface roughness in the measurement field is measured with a laser microscope ("OPTELICS HYBRID" (trademark) manufactured by Lasertec Corporation). The surface roughness is defined as the "surface roughness $R_{max}$ at the second point".

(5-4) Calculate the ratio $R_{min}/R_{max}$ based on the "surface roughness $R_{min}$ at the first point" and the "surface roughness $R_{max}$ at the second point".

For example, the surface roughness $R_{min}$ at the first point may have a lower limit of 0.05, 0.06 or 0.07, and an upper limit of 0.21, 0.25 or 0.30.

For example, the surface roughness $R_{max}$ at the second point may have a lower limit of 0.05, 0.06 or 0.07, and an upper limit of 0.21, 0.25 or 0.30.

Embodiment 1-2: Tapered Cutter

In Embodiment 1-2, the diamond-coated tool is a tapered cutter. As illustrated in FIG. 3, the tapered cutter, i.e., a diamond-coated tool 210 includes a body 23 and a shank 24 connected to the body 23. The body 23 includes a blade 25 which is formed with a cutting edge, and the cutting edge is constituted by a peripheral cutting edge 27. As illustrated in FIG. 2, in the cross section taken along line X-X, the blade 25 includes a base material 1 and a diamond layer 2 formed on the base material 1.

As illustrated in FIG. 3, the blade 25 extends along the rotation axis O of the tool. Therefore, in Embodiment 1-2, the length L of the blade 25 along the extending direction thereof refers to the length of the blade 25 along the rotation axis O of the tool.

Although the blade 25 is formed by the entire body 23 as illustrated in FIG. 3, the blade may be formed by a part of the body 23.

Since the ratio $d_{min}/d_{max}$, the ratio $I_{min}/I_{max}$, the ratio $Ix_{min}/Ix_{max}$, the ratio $D_{min}/D_{max}$, the ratio $R_{min}/R_{max}$ of the blade and their measurement methods are the same as those in Embodiment 1-1, the description thereof will not be repeated.

Embodiment 1-3: Drill

In Embodiment 1-3, the diamond-coated tool is a drill. FIG. 4 is a view illustrating an example configuration of a diamond-coated tool according to Embodiment 1-3. FIG. 5 is an enlarged view illustrating a first blade 35A of FIG. 4. FIG. 6 is an enlarged view illustrating a second blade 35B of FIG. 4.

As illustrated in FIGS. 4 to 6, the drill, i.e., a diamond-coated tool 310 includes a body 33 and a shank 34 connected to the body 33. The body 33 includes a first blade 35A with a cutting edge 8A formed at the distal end, and a second blade 35B with a cutting edge 8B formed closer to the side of the shank 34. During the drilling, the cutting edge 8B chamfers the entrance of a drilled hole.

As illustrated in FIG. 2, in the cross section taken along line X-X, each of the blade 35A and the blade 35B includes a base material 1 and a diamond layer 2 formed on the base material 1.

As illustrated in FIG. 4, each of the blade 35A and the blade 35B extends along the rotation axis O of the tool. Therefore, in Embodiment 1-3, the length L of each of the blade 35A and the blade 35B along the extending direction thereof refers to the length of each of the blade 35A and the blade 35B along the rotation axis O of the tool.

Since the ratio $d_{min}/d_{max}$, the ratio $I_{min}/I_{max}$, the ratio $Ix_{min}/Ix_{max}$, the ratio $D_{min}/D_{max}$, the ratio $R_{min}/R_{max}$ of each of the blade 35A and the blade 35B and their measurement methods are the same as those in Embodiment 1-1, the description thereof will not be repeated.

Embodiment 2: Method of Manufacturing Diamond-Coated Tool

A method of manufacturing a diamond-coated tool according to the present disclosure is the method of manufacturing a diamond-coated tool according to Embodiment 1. The method includes a step of preparing a base material (hereinafter also referred to as a "base material preparation step"); and a step of forming a diamond layer on the base material by a hot filament CVD process (hereinafter also referred to as a "hot filament CVD step") to obtain a diamond-coated tool, and the hot filament CVD process is performed in such a manner that the temperature distribution in a blade of the base material where a cutting edge is formed is controlled within 5%.

(Base Material Preparation Step)

First, the base material is prepared. Since the base material is the same as the base material described in Embodiment 1-1, the description thereof will not be repeated.

(Hot Filament CVD Step)

Next, a diamond layer is formed on the base material by a hot filament CVD process to obtain a diamond-coated tool. In the hot filament CVD process, for example, a diamond layer is formed on a base material by heating the base material while supplying methane and hydrogen into a vacuum furnace. The hot filament CVD process is performed in such a manner that the temperature distribution in the blade of the base material where a cutting edge is formed is controlled within 5%.

The temperature distribution in the blade where the cutting edge is formed being controlled within 5% means that when the surface temperature at both ends of the blade region is measured by using a radiation thermometer, the temperature difference is within 5% of the temperature of the front end of the cutting edge.

Figure 11:
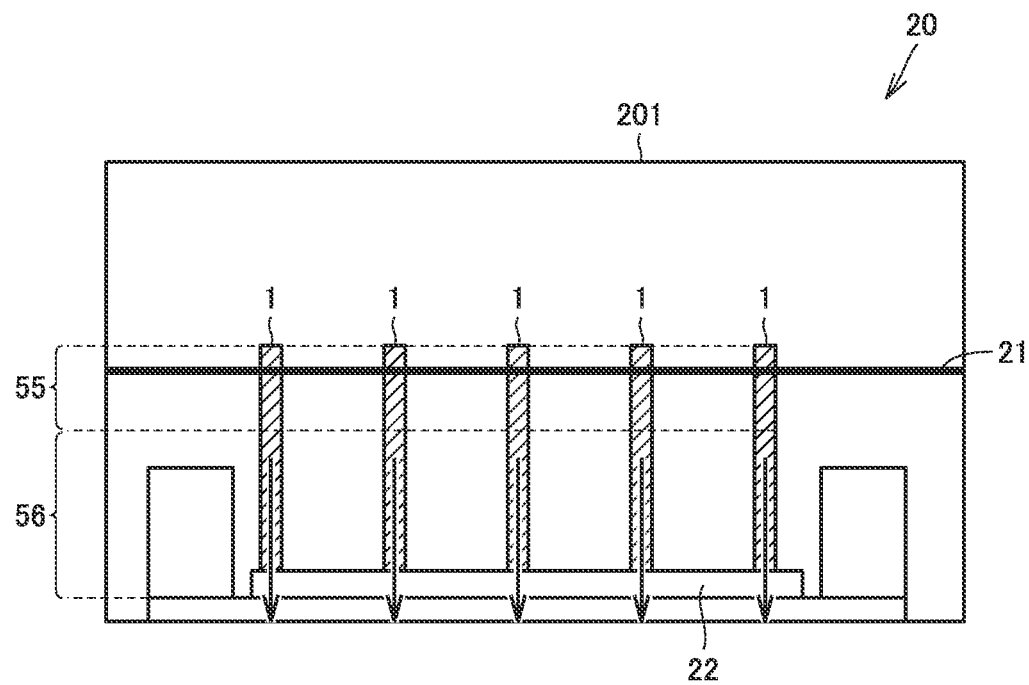
FIG. 11 is a front view illustrating a conventional hot filament CVD apparatus as an example.
Figure 12:
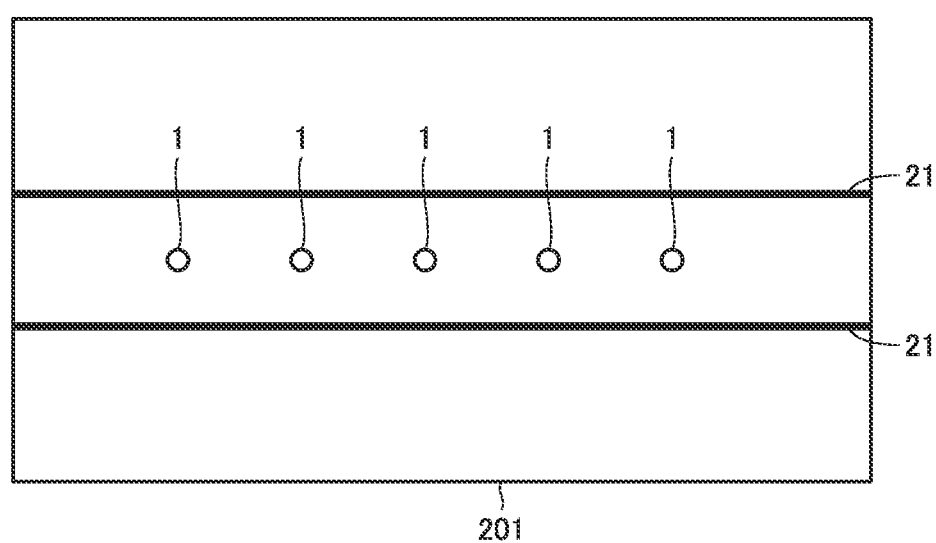
FIG. 12 is a top view of the hot filament CVD apparatus illustrated in FIG. 11.
Figure 13:
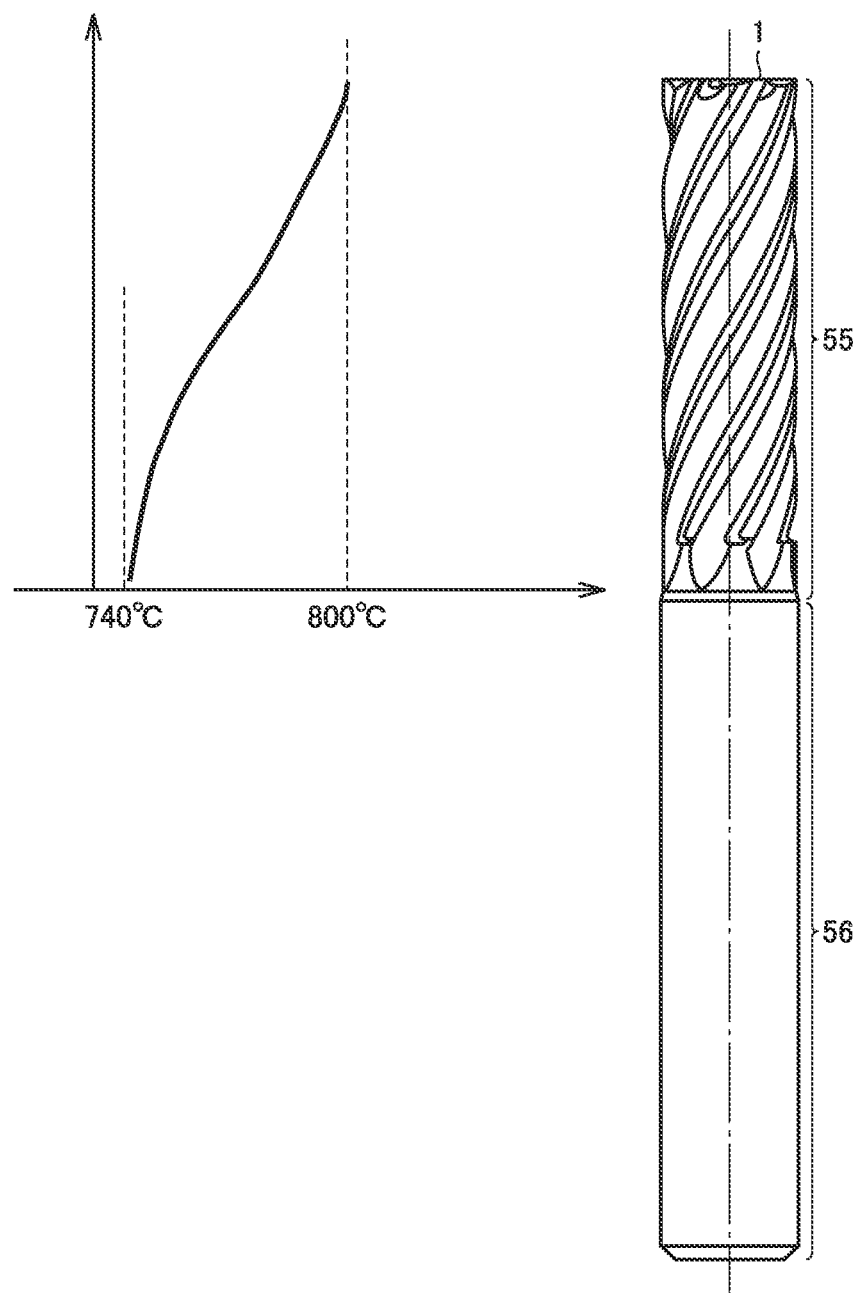
FIG. 13 is a diagram illustrating a surface temperature distribution of a base material during film formation by a conventional hot filament CVD process.

In order to further understand the hot filament CVD process used in the present disclosure, a conventional hot filament CVD process will be described with reference to FIGS. 11 to 13. FIG. 11 is a front view illustrating a conventional hot filament CVD apparatus as an example. FIG. 12 is a top view of the hot filament CVD apparatus illustrated in FIG. 11. FIG. 13 is a diagram illustrating a surface temperature distribution of the base material during film formation by the conventional hot filament CVD process.

As illustrated in FIGS. 11 and 12, a conventional hot filament CVD apparatus 20 includes filaments 21 and a mounting stage 22 for mounting the base material in a vacuum furnace 201. In the conventional hot filament CVD apparatus 20, it is considered that the hot filament CVD process may be successfully performed as long as a region 55 of the base material 1 corresponding to the cutting edge (hereinafter also referred to as a "blade region") is arranged in the heating range of the filaments. Therefore, a non-film formation region 56 corresponding to the shank or the like is arranged outside the heating range of the filaments.

In this case, as illustrated in FIG. 13, the front end (upper end in FIG. 13) of the base material has the highest temperature since the heat is trapped in the distal end. On the other hand, the temperature of the blade region 55 decreases toward the shank which is not heated, and the heat is radiated from the base material 1 to the mounting stage 22 (as illustrated by the downward arrows in FIG. 11), which causes a temperature distribution in the blade region 55. Based on this finding, the present inventors have found that if the shank is arranged outside the heating range, the temperature of a part of the blade closer to the shank may decrease, which may cause variations in the film thickness.

Figure 14:
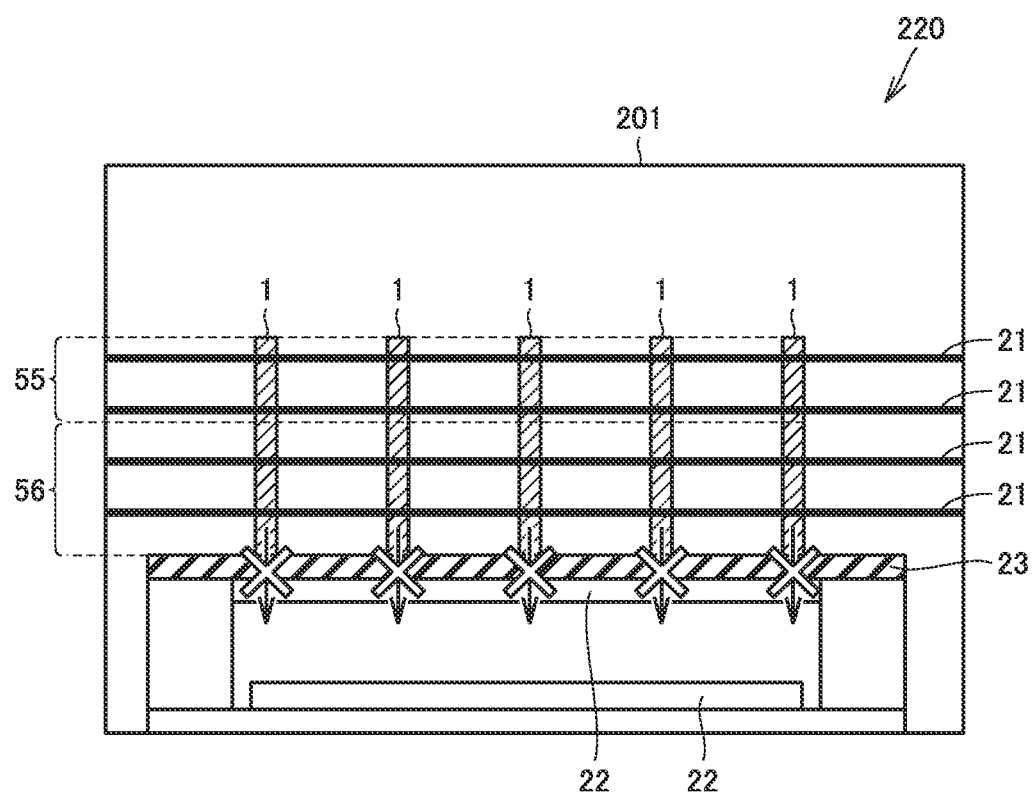
FIG. 14 is a diagram illustrating an example hot filament CVD apparatus used in Embodiment 2.

As a result of intensive studies, the present inventors have found that, as illustrated in FIG. 14, in the hot filament CVD apparatus 220, the entire base material 1 is set in the heating range of the filaments 21, and a heat insulating material 23 is provided between the non-film formation region 56 such as the shank and the mounting stage so as to improve the thermal insulation by preventing the heat from being radiated from the base material 1 to the mounting stage 22 (along the direction of downward arrows in FIG. 14), the temperature distribution in the blade region can be controlled within 5%, which makes it possible to make the thickness of the diamond layer in the blade uniform.

Figure 15:
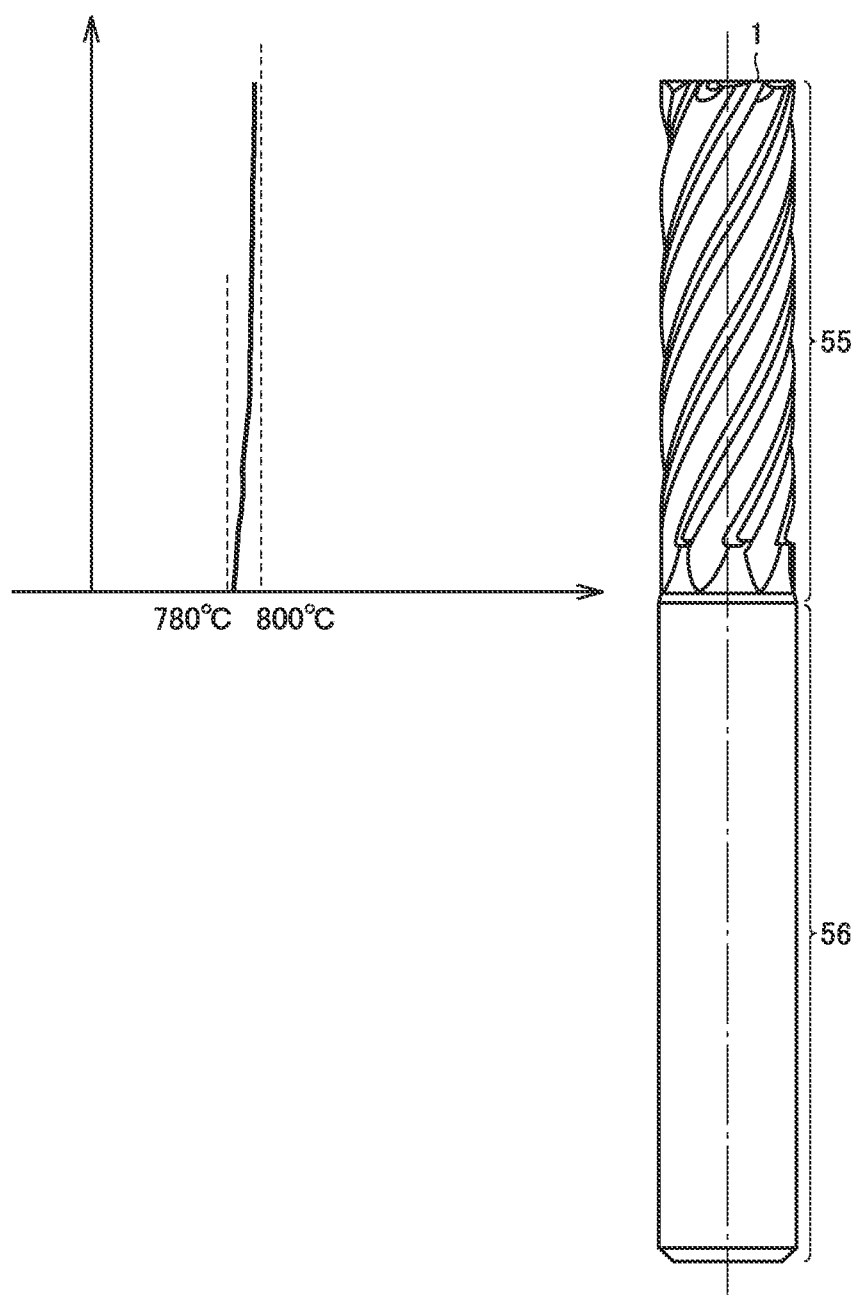
FIG. 15 is a diagram illustrating a surface temperature distribution of a base material during film formation by a hot filament CVD process according to Embodiment 2.

In this case, as illustrated in FIG. 15, the temperature distribution between the distal end of the base material and a part thereof closer to the shank becomes small, and thereby the film thickness becomes uniform.

The method of setting the temperature distribution in the blade where the cutting edge is formed within 5% is not limited to that described above. The number of the filaments, the distance between the filaments and the base material, the position of the base material in the furnace, and the like may be appropriately modified based on the shape, the type and the like of the base material.

EXAMPLES

The present disclosure will be described more specifically with reference to examples. However, the present disclosure is not limited by the examples.

Sample 1

As the base material, an end mill ($\varphi=10$ mm) which is made of cemented carbide and has a shape as illustrated in FIG. 1 was prepared. The length L of the blade of the end mill was 30 mm.

Subsequently, a seeding treatment was performed by applying diamond powder to the surface of the base material. Specifically, the seeding treatment was performed by rubbing diamond powder having an average particle diameter of 5 μm on the surface of the base material, washing the base material with ethanol, and drying the base material. Next, the base material subjected to the seeding treatment was set in the hot filament CVD apparatus illustrated in FIG. 14.

The diamond layer of Sample 1 was formed under the following conditions. The filament current was controlled in such a manner that the average surface temperature of the tool was 800° C. Methane and hydrogen were supplied into the furnace at such a flow rate that the concentration of methane was 1%. The pressure during the film formation was 500 mPa. During the film formation, the temperature distribution in the blade of the base material where the cutting edge is formed was controlled within 5%. Thus, a diamond-coated tool of Sample 1 which is formed with a diamond layer on the base material was obtained.

Samples 2 to 4

As the base material of each of Samples 2 to 4, the same base material as that of Sample 1 was prepared, and the seeding treatment was performed in the same manner as that of Sample 1. A diamond layer was formed on the base material in the same hot filament CVD apparatus as that of Sample 1 to obtain a diamond-coated tool.

The diamond layer of Sample 2 was formed under the following conditions. The filament current was controlled in such a manner that the average surface temperature of the tool was 780° C. Methane and hydrogen were supplied into the furnace at such a flow rate that the concentration of methane was 1%. The pressure during the film formation was 500 mPa. During the film formation, the temperature distribution in the blade of the base material where the cutting edge is formed was controlled within 5%. Thus, a diamond-coated tool of Sample 2 which is formed with a diamond layer on the base material was obtained.

The diamond layer of Sample 3 was formed under the following conditions. The filament current was controlled in such a manner that the average surface temperature of the tool was 780° C. Methane and hydrogen were supplied into the furnace at such a flow rate that the concentration of methane was 3%. The pressure during the film formation was 500 mPa. During the film formation, the temperature distribution in the blade of the base material where the cutting edge is formed was controlled within 5%. Thus, a diamond-coated tool of Sample 3 which is formed with a diamond layer on the base material was obtained.

The diamond layer of Sample 3-1 was formed under the following conditions. The filament current was controlled in such a manner that the average surface temperature of the tool was 760° C. Methane and hydrogen were supplied into the furnace at such a flow rate that the concentration of methane was 3%. The pressure during the film formation was 500 mPa. During the film formation, the temperature distribution in the blade of the base material where the cutting edge is formed was controlled within 5%. Thus, a diamond-coated tool of Sample 3-1 which is formed with a diamond layer on the base material was obtained.

The diamond layer of Sample 3-2 was formed under the following conditions. The filament current was controlled in such a manner that the average surface temperature of the tool was 800° C. Methane and hydrogen were supplied into the furnace at such a flow rate that the concentration of methane was 4%. The pressure during the film formation was 500 mPa. During the film formation, the temperature distribution in the blade of the base material where the cutting edge is formed was controlled within 5%. Thus, a diamond-coated tool of Sample 3-1 which is formed with a diamond layer on the base material was obtained.

The diamond layer of Sample 4 was formed under the following conditions. The filament current was controlled in such a manner that the average surface temperature of the tool was 800° C. Methane and hydrogen were supplied into the furnace at such a flow rate that the concentration of methane was 3%. The pressure during the film formation was 500 mPa. During the film formation, the temperature distribution in the blade of the base material where the cutting edge is formed was controlled within 5%. Thus, a diamond-coated tool of Sample 4 which is formed with a diamond layer on the base material was obtained.

Samples 5 to 8

As the base material of each of Samples 5 to 8, the same base material as that of Sample 1 was prepared, and the seeding treatment was performed in the same manner as that of Sample 1. A diamond layer was formed on the base material in the hot filament CVD apparatus without the temperature distribution control to obtain a diamond-coated tool.

The diamond layer of Sample 5 was formed under the following conditions. The filament current was controlled in such a manner that the average surface temperature of the tool was 780° C. Methane and hydrogen were supplied into the furnace at such a flow rate that the concentration of methane was 3%. The pressure during the film formation was 500 mPa. During the film formation, the temperature distribution in the blade of the base material where the cutting edge is formed was more than 5%. Thus, a diamond-coated tool of Sample 5 was obtained.

The diamond layer of Sample 6 was formed under the following conditions. The filament current was controlled in such a manner that the average surface temperature of the tool was 800° C. Methane and hydrogen were supplied into the furnace at such a flow rate that the concentration of methane was 3%. The pressure during the film formation was 500 mPa. During the film formation, the temperature distribution in the blade of the base material where the cutting edge is formed was more than 5%. Thus, a diamond-coated tool of Sample 6 was obtained.

The diamond layer of Sample 7 was formed under the following conditions. The filament current was controlled in such a manner that the average surface temperature of the tool was 800° C. Methane and hydrogen were supplied into the furnace at such a flow rate that the concentration of methane was 1%. The pressure during the film formation was 500 mPa. During the film formation, the temperature distribution in the blade of the base material where the cutting edge is formed was more than 5%. Thus, a diamond-coated tool of Sample 7 was obtained.

The diamond layer of Sample 8 was formed under the following conditions. The filament current was controlled in such a manner that the average surface temperature of the tool was 780° C. Methane and hydrogen were supplied into the furnace at such a flow rate that the concentration of methane was 1%. The pressure during the film formation was 500 mPa. During the film formation, the temperature distribution in the blade of the base material where the cutting edge is formed was more than 5%. Thus, a diamond-coated tool of Sample 8 was obtained.

<Evaluation>

($d_{min}/d_{max}$, $I_{min}/I_{max}$, $Ix_{min}/Ix_{max}$, $D_{min}/D_{max}$, $R_{min}/R_{max}$)

In the diamond-coated tools of samples 1 to 8, $d_{min}/d_{max}$, $I_{min}/I_{max}$, $Ix_{min}/Ix_{max}$, $D_{min}/D_{max}$, and $R_{min}/R_{max}$ were measured. Since the measurement method has been specifically described in Embodiment 1, the description thereof will not be repeated. The results are shown in Table 1.

(Cutting Test)

The diamond-coated tool of each of Samples 1 to 8 was subjected to a cutting test under the following conditions.
workpiece: carbon fiber reinforced resin
cutting speed: 270 m/min
revolution speed: 8600 rpm
feed speed: 860 m/min
cutting depth: 10 mm In the cutting test, the distance until the diamond layer is peeled off (peeling distance) was measured. The peeling of the diamond layer was confirmed by observing the diamond layer with an optical microscope. The longer the peeling distance is, the longer the tool life is. The results are shown in Table 1.

TABLE 1

| Sample No. | Thickness | | | Raman Shift | | | C1s Spectrum | | | Average Particle Diameter | | | Surface Roughness Ra | | | Evaluation |
| | dmin (μm) | dmax (μm) | dmin/dmax | Ismin (Imin) | Ismax (Imax) | Imin/Imax | I2min (Ixmin) | I2max (Ixmax) | Ixmin/Ixmax | Dmin (μm) | Dmax (μm) | Dmin/Dmax | Rmin (μm) | Rmax (μm) | Rmin/Rmax | Peeling Distance (m) |
|---|---|---|---|---|---|---|---|---|---|---|---|---|---|---|---|---|
| 1 | 13.5 | 15.3 | 0.88 | 0.48 | 0.59 | 0.81 | 0.73 | 0.9 | 0.81 | 0.26 | 0.32 | 0.80 | 0.12 | 0.15 | 0.80 | 35 |
| 2 | 14.2 | 15.1 | 0.94 | 0.47 | 0.55 | 0.86 | 0.72 | 0.84 | 0.85 | 0.26 | 0.30 | 0.85 | 0.12 | 0.14 | 0.85 | 37 |
| 3 | 12.6 | 14.7 | 0.86 | 0.37 | 0.48 | 0.77 | 0.56 | 0.73 | 0.77 | 0.20 | 0.26 | 0.76 | 0.09 | 0.12 | 0.76 | 33 |

TABLE 1-continued

| | | | | Raman Shift | | | C1s Spectrum | | | Average Particle Diameter | | | Surface Roughness Ra | | | Evaluation |
|---|---|---|---|---|---|---|---|---|---|---|---|---|---|---|---|---|
| | Thickness | | | Idmin/ Ismin | Idmax/ Ismax | Imin/ Imax | I3min/ I2min | I3max/ I2max | Ixmin/ Ixmax | | | | | | | |
| Sample No. | dmin (μm) | dmax (μm) | dmin/ dmax | (Imin) | (Imax) | | (Ixmin) | (Ixmax) | | Dmin (μm) | Dmax (μm) | Dmin/ Dmax | Rmin (μm) | Rmax (μm) | Rmin/ Rmax | Peeling Distance (m) |
| 3-1 | 11.4 | 14.6 | 0.78 | 0.41 | 0.53 | 0.77 | 0.49 | 0.71 | 0.69 | 0.19 | 0.26 | 0.73 | 0.09 | 0.12 | 0.72 | 32 |
| 3-2 | 9.9 | 14.1 | 0.70 | 0.34 | 0.52 | 0.65 | 0.43 | 0.72 | 0.60 | 0.17 | 0.23 | 0.74 | 0.08 | 0.11 | 0.73 | 29 |
| 4 | 15.6 | 16.4 | 0.95 | 0.48 | 0.55 | 0.87 | 0.73 | 0.84 | 0.86 | 0.26 | 0.30 | 0.86 | 0.12 | 0.14 | 0.86 | 40 |
| 5 | 9.3 | 15.2 | 0.61 | 0.33 | 0.59 | 0.56 | 0.50 | 0.89 | 0.56 | 0.18 | 0.32 | 0.56 | 0.08 | 0.15 | 0.55 | 24 |
| 6 | 9.5 | 15.1 | 0.63 | 0.48 | 0.82 | 0.59 | 0.54 | 0.92 | 0.59 | 0.28 | 0.48 | 0.59 | 0.13 | 0.23 | 0.59 | 25 |
| 7 | 8.3 | 14.9 | 0.56 | 0.49 | 0.93 | 0.53 | 0.50 | 0.95 | 0.53 | 0.49 | 0.94 | 0.53 | 0.23 | 0.44 | 0.52 | 22 |
| 8 | 7.5 | 15.5 | 0.48 | 0.27 | 0.60 | 0.44 | 0.40 | 0.91 | 0.44 | 0.14 | 0.32 | 0.44 | 0.07 | 0.15 | 0.44 | 19 |

<Discussion>

The method of manufacturing a diamond-coated tool of each of Sample 1 to Sample 4 corresponds to the example. The diamond-coated tool of each of Samples 1 to 4 corresponds to the example. It was confirmed that the diamond-coated tool of each of Samples 1 to 4 had a longer peeling distance, and thereby a longer tool life.

The method of manufacturing a diamond-coated tool of each of Samples 5 to 8 corresponds to the comparative example. The diamond-coated tool of each of Samples 5 to 8 corresponds to the comparative example. The diamond-coated tool of each of Samples 5 to 8 had a shorter peeling distance than the diamond-coated tool of each of Samples 1 to 4.

Although the embodiments and examples of the present disclosure have been described above, it is expected from the beginning that the configurations of the embodiments and examples described above may be combined appropriately or modified in various ways.

It should be understood that the embodiments and examples disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: base material; 2: diamond layer; 3, 23, 33: body; 4, 24, 34: shank; 5, 25, 35A, 35B: blade; 6: bottom cutting edge; 7, 27: peripheral cutting edge; 8, 8A, 8B: cutting edge; 10, 210, 310, 410: diamond-coated tool; 20, 220: hot filament CVD apparatus; 21: filament; 55: blade region; 56: non-film formation region; 201: vacuum furnace

The invention claimed is:

1. A diamond-coated tool provided with a blade which includes a base material and a diamond layer formed on the base material,
   wherein a length of the blade along an extending direction thereof is denoted by L, and a thickness of the diamond layer of the blade is measured at a total number of 11 points which are arranged from one end of the blade along the extending direction thereof and separated from each other at an interval of L/10, the thickness being the same at all of the 11 points, or a ratio $d_{min}/d_{max}$ between a minimum value $d_{min}$ of the thickness and a maximum value $d_{max}$ of the thickness being 0.7 or more and less than 1, and
   wherein a Raman spectrum of the diamond layer in the range of Raman shift 900 cm$^{-1}$ to 2000 cm$^{-1}$ is measured at a first point where the thickness has a minimum value $d_{min}$ and a second point where the thickness has a maximum value $d_{max}$,
   a ratio $I_{min}/I_{max}$ between $I_{min}$, which is a ratio $Id_{min}/Is_{min}$ at the first point between a peak area intensity $Id_{min}$ of diamond and an area intensity $Is_{min}$ of the entire spectrum, and $I_{max}$, which is a ratio $Id_{max}/Is_{max}$ at the second point between a peak area intensity $Id_{max}$ of diamond and an area intensity $Is_{max}$ of the entire spectrum, is 0.7 or more and 1 or less.

2. The diamond-coated tool according to claim 1, wherein the ratio $d_{min}/d_{max}$ is 0.85 or more and less than 1.

3. The diamond-coated tool according to claim 1, wherein a C1s spectrum of the diamond layer is measured by X-ray photoelectron spectroscopy at a first point where the thickness has a minimum value $d_{min}$ and a second point where the thickness has a maximum value $d_{max}$,
   a ratio $Ix_{min}/Ix_{max}$ between $Ix_{min}$, which is a ratio $I3_{min}/I2_{min}$ at the first point between a peak area intensity $I3_{min}$ of sp3 carbon and a peak area intensity $I2_{min}$ of sp2 carbon, and $Ix_{max}$, which is a ratio $I3_{max}/I2_{max}$ at the second point between a peak area intensity $I3_{max}$ of sp3 carbon and a peak area intensity $I2_{max}$ of sp2 carbon, is 0.7 or more and 1 or less.

4. The diamond-coated tool according to claim 1, wherein an average particle diameter of the diamond layer is measured by electron backscatter diffraction at a first point where the thickness has a minimum value $d_{min}$ and a second point where the thickness has a maximum value $d_{max}$,
   a ratio $D_{min}/D_{max}$ between the average particle diameter $D_{min}$ at the first point and the average particle diameter $D_{max}$ at the second point is 0.7 or more and 1 or less.

5. The diamond-coated tool according to claim 1, wherein a surface roughness Ra of the diamond layer is measured with a laser microscope at a first point where the thickness has a minimum value $d_{min}$ and a second point where the thickness has a maximum value $d_{max}$,
   a ratio $R_{min}/R_{max}$ between a surface roughness $R_{min}$ at the first point and a surface roughness $R_{max}$ at the second point is 0.7 or more and 1 or less.

6. A method of manufacturing a diamond-coated tool according to claim 1, the method comprising:
   preparing a base material; and
   forming a diamond layer on the base material by a hot filament CVD process to obtain a diamond-coated tool,
   the hot filament CVD process being performed in such a manner that the temperature distribution in a blade of the base material where a cutting edge is formed is controlled within 5%.

7. The diamond-coated tool according to claim 1, wherein the ratio $d_{min}/d_{max}$ is 0.7 or more and less than 0.95.

\* \* \* \* \*